US012641099B2

(12) United States Patent
Rama

(10) Patent No.: US 12,641,099 B2
(45) Date of Patent: May 26, 2026

(54) METHOD AND SYSTEM FOR ANOMALY DETECTION

(71) Applicant: Microsoft Technology Licensing, LLC, Redmond, WA (US)

(72) Inventor: Kiran Rama, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1043 days.

(21) Appl. No.: 17/749,001

(22) Filed: May 19, 2022

(65) Prior Publication Data

US 2023/0379347 A1 Nov. 23, 2023

(51) Int. Cl.

| *G06F 18/22* | (2023.01) |
| *G06F 18/214* | (2023.01) |
| *G06N 3/04* | (2023.01) |
| *H04L 9/40* | (2022.01) |

(52) U.S. Cl.
CPC ........ *H04L 63/1425* (2013.01); *G06F 18/214* (2023.01); *G06F 18/22* (2023.01); *G06N 3/04* (2013.01); *H04L 63/1416* (2013.01)

(58) Field of Classification Search
None
See application file for complete search history.

(56) References Cited

U.S. PATENT DOCUMENTS

2021/0177307 A1 6/2021 Song et al.
2021/0344695 A1* 11/2021 Palani ................... G06N 3/043

OTHER PUBLICATIONS

Andresini, et al., "Multi-Channel Deep Feature Learning for Intrusion Detection", In Journal of IEEE Access, vol. 8, Mar. 16, 2020, pp. 53346-53359.
"International Search Report and Written Opinion issued in PCT Application No. PCT/US2023/012983", Mailed Date: May 12, 2023, 14 Pages.
Utkin, et al., "A Siamese Autoencoder Preserving Distances for Anomaly Detection in Multi-robot Systems", International Conference on Control, Artificial Intelligence, Robotics & Optimization, May 20, 2017, pp. 39-44.

* cited by examiner

*Primary Examiner* — Alexey Shmatov
(74) *Attorney, Agent, or Firm* — ArentFox Schiff LLP

(57) ABSTRACT

Example aspects include techniques for anomaly detection via sparse judgmental samples. These techniques may include determining, for an observation, anomalous autoencoder output (AAO) of a first layer of a first autoencoder trained used anomalous observations and determining, for the observation, conforming autoencoder output (CAO) of a second layer of a second autoencoder trained used conforming observations. In addition, the techniques may include calculating an anomaly value based on comparing the AAO to an anomalous signature output by the first layer of the first autoencoder, and calculating a conforming value based on comparing the CAO to a conforming signature output by the second layer of the second autoencoder. Further, the techniques may include determining whether the observation is anomalous based on comparing the anomaly value to the conforming value.

20 Claims, 5 Drawing Sheets

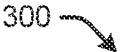
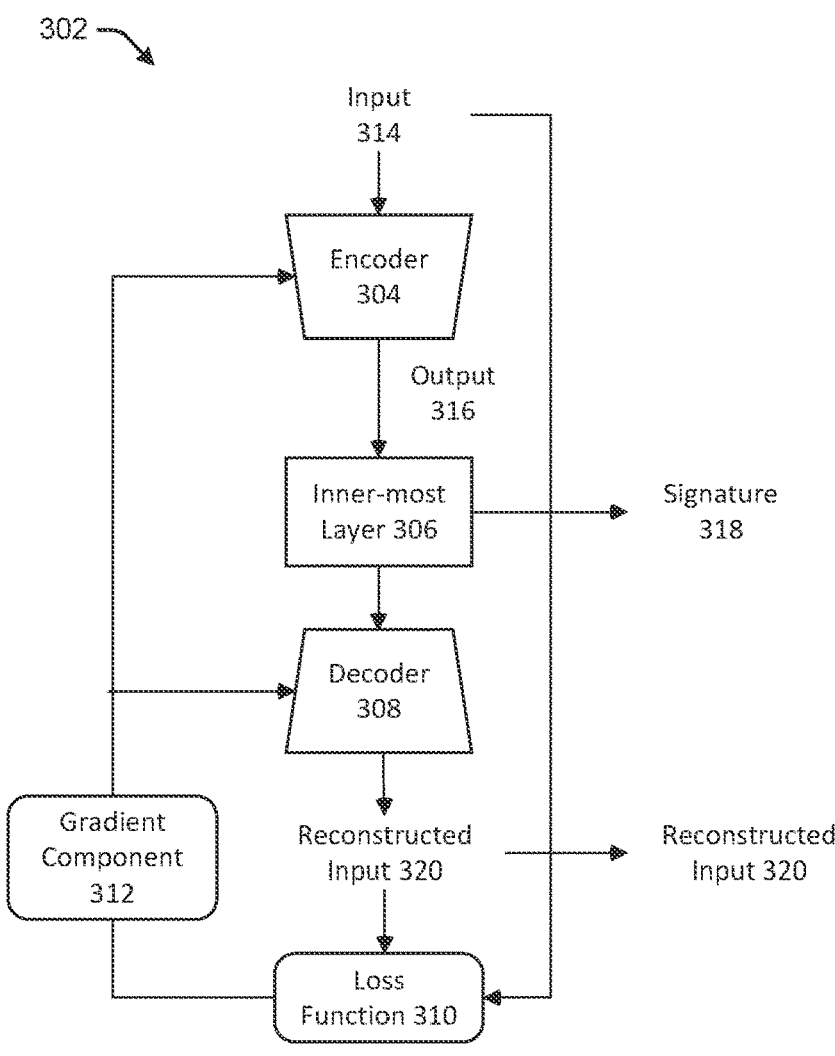
FIG. 3

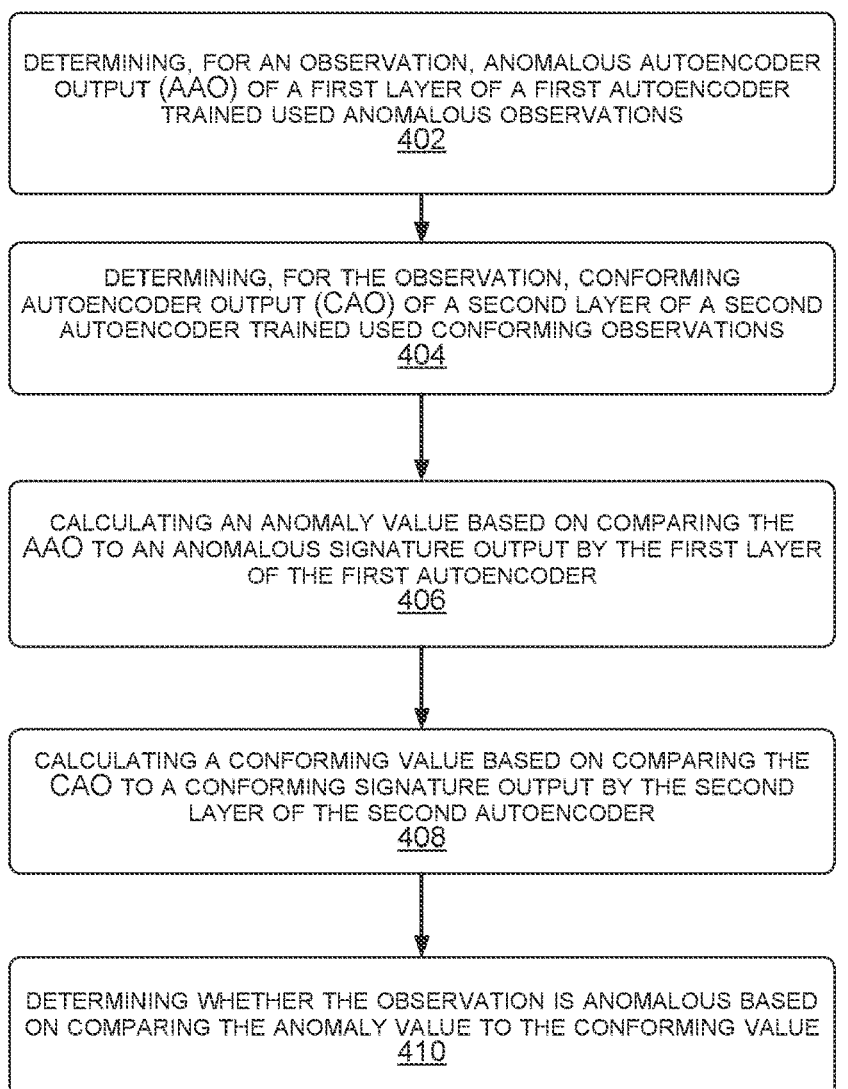

400

DETERMINING, FOR AN OBSERVATION, ANOMALOUS AUTOENCODER OUTPUT (AAO) OF A FIRST LAYER OF A FIRST AUTOENCODER TRAINED USED ANOMALOUS OBSERVATIONS
402

DETERMINING, FOR THE OBSERVATION, CONFORMING AUTOENCODER OUTPUT (CAO) OF A SECOND LAYER OF A SECOND AUTOENCODER TRAINED USED CONFORMING OBSERVATIONS
404

CALCULATING AN ANOMALY VALUE BASED ON COMPARING THE AAO TO AN ANOMALOUS SIGNATURE OUTPUT BY THE FIRST LAYER OF THE FIRST AUTOENCODER
406

CALCULATING A CONFORMING VALUE BASED ON COMPARING THE CAO TO A CONFORMING SIGNATURE OUTPUT BY THE SECOND LAYER OF THE SECOND AUTOENCODER
408

DETERMINING WHETHER THE OBSERVATION IS ANOMALOUS BASED ON COMPARING THE ANOMALY VALUE TO THE CONFORMING VALUE
410

FIG. 4

METHOD AND SYSTEM FOR ANOMALY DETECTION

BACKGROUND

Anomaly detection is one of the most prevalent use cases in engineering systems. For example, anomaly detection may be employed in cloud computing contexts, cloud storage contexts, network applications, and commerce and billing systems. In some use cases, early detection of anomalies may result in prevention of system failures and/or increased customer satisfaction. In some other use cases, anomaly detection may result in prevention of incidents of fraud, and over-billing or under-billing of customers. However, system operators are unable to effectively leverage anomaly detection when the underlying system is unable to meet accuracy expectations.

Further, traditional anomaly detection methods are classified into those based on distance (e.g., k-nearest neighbor, principal components analysis, angle-based outlier detection), local outlier factors (e.g., cluster-based local outlier factors), partition-based methods (isolation forest), re-construction-based methods (e.g., principal component analysis, autoencoders) and non-parametric statistical methods (e.g., histogram-based outlier score). In modern systems, anomaly detection requires applying the aforementioned anomaly detection methods to large datasets including observations for billions of events in short periods of time. But is has proven impractical, costly, and burdensome to accurately employ (e.g., label in supervised learning contexts) such datasets in view of the size of the data sets and the time constraints of the various applications.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include determining, for an observation, anomalous autoencoder output (AAO) of a first layer of a first autoencoder trained used anomalous observations. Further, the method may include determining, for the observation, conforming autoencoder output (CAO) of a second layer of a second autoencoder trained used conforming observations. In addition, the method may further include calculating an anomaly value based on comparing the AAO to an anomalous signature output by the first layer of the first autoencoder. Further, the method may include calculating a conforming value based on comparing the CAO to a conforming signature output by the second layer of the second autoencoder. In addition, the method may further include determining whether the observation is anomalous based on comparing the anomaly value to the conforming value.

In an aspect, a system may include a memory storing instructions thereon and at least one processor coupled with the memory. Further, the at least one processor may be configured by the instructions to determine, for an observation, anomalous autoencoder output (AAO) of a first layer of a first autoencoder trained used anomalous observations.

Further, the processor may be further configured by the instructions to determine, for the observation, conforming autoencoder output (CAO) of a second layer of a second autoencoder trained used conforming observations. In addition, the processor may be further configured by the instructions to calculate an anomaly value based on comparing the AAO to an anomalous signature output by the first layer of the first autoencoder. Further, the processor may be further configured by the instructions to calculate a conforming value based on comparing the CAO to a conforming signature output by the second layer of the second autoencoder. In addition, the processor may be further configured by the instructions to determine whether the observation is anomalous based on comparing the anomaly value to the conforming value.

In another aspect, an example computer-readable medium (e.g., non-transitory computer-readable medium) storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 3 is a diagram illustrating an example autoencoder, in accordance with some aspects of the present disclosure.

FIG. 4 is a flow diagram illustrating an example method for anomaly detection, in accordance with some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing anomaly detection even in contexts with sparse judgmental samples. As used herein, in some aspects, anomaly detection may refer to identifying data that does not meet expected normal patterns. Anomaly Detection is one of the most prevalent use cases in engineering in products such as cloud computing contexts, cloud storage contexts, network applications, and commerce and billing systems. In product engineering contexts, early detection of anomalies can result in prevention of catastrophic system failures in products and increased customer satisfaction. In commerce and billing contexts, anomaly detection can prevent incidents of fraud, over-billing, and under-billing.

Further, as used herein, a judgmental sample may refer to a sample labeled by an expert. Aspects of the present disclosure provide a dual autoencoder-based anomaly detection system that may perform local anomaly detection across observations captured by a local device and/or remote anomaly detection on observations captured by one or more other devices. Training conventional autoencoder-based anomaly detection systems includes extensive review and labeling of extremely large amounts of datasets, which negatively affects performance by requiring a cumbersome, costly, and impractical training process. Accordingly, the present technique includes training a first autoencoder using sparse anomalous samples and a second autoencoder using sparse conforming samples, and employing the bottleneck layer output from each autoencoder for an observation to determine whether the observation is anomalous, thereby improving performance by reducing the length of the training process without sacrificing accuracy.

Illustrative Environment

Figure 1:
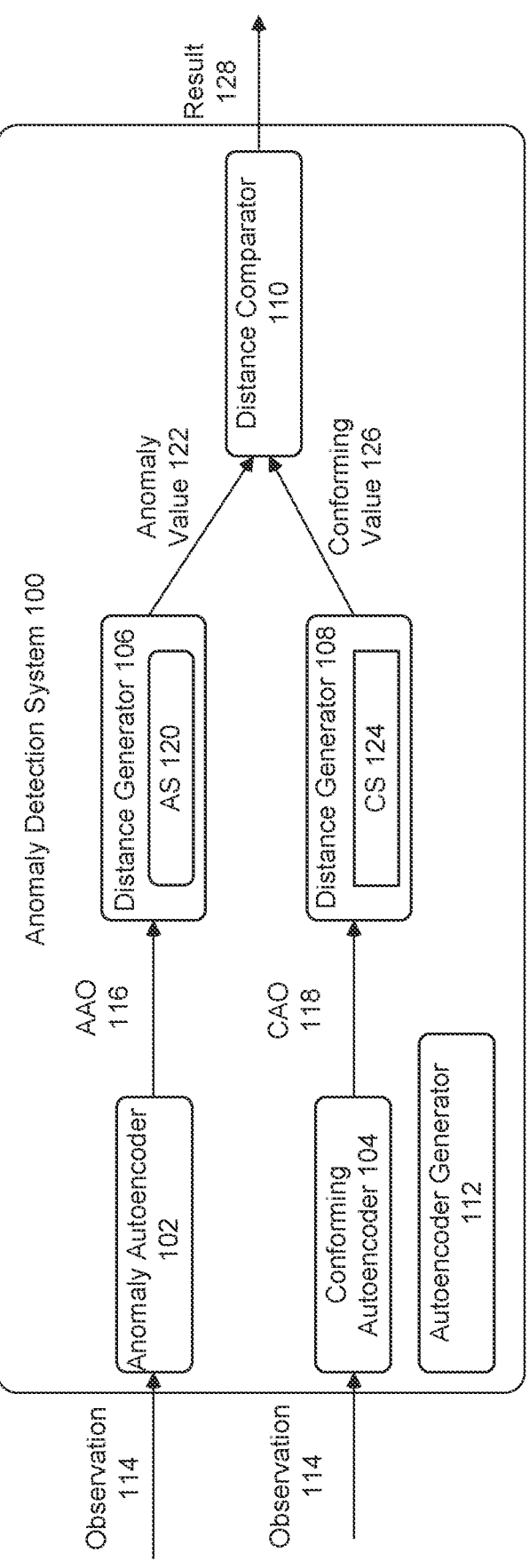
FIG. 1 illustrates an example architecture of anomaly detection system, in accordance with some aspects of the present disclosure.

FIG. 1 is a diagram showing an example of an anomaly detection system 100, in accordance with some aspects of the present disclosure.

As illustrated in FIG. 1, the anomaly detection system 100 configured to implement anomaly detection via sparse judgmental sample. Some examples of an anomaly detection system 100 include computing devices, smartphone devices, Internet of Things (IoT) devices, unmanned aerial vehicles (UAVs), robots, process automation equipment, sensors, control devices, vehicles, transportation equipment, tactile interaction equipment, virtual and augmented reality (VR and AR) devices, industrial machines, etc. In some aspects, the anomaly detection system 100 may be a cloud computing platform that provides other computing devices with distributed storage and access to software, services, files, and/or data via one or more network(s), e.g., cellular networks, wireless networks, local area networks (LANs), wide area networks (WANs), personal area networks (PANs), the Internet, or any other type of network configured to communicate information between computing devices.

As illustrated in FIG. 1, the anomaly detection system an anomaly autoencoder 102, a conforming autoencoder 104, a first distance generator 106, a second distance generator 108, a distance comparator 110, and an autoencoder generator 112. As used herein, in some aspects, an autoencoder may be a deep neural network that attempts to re-create input as output by passing the input observations through an encoder network, followed by a decoder network. Further, autoencoders learn a compressed representation of the input. An autoencoder may be configured to compress and encode data into an encoded representation, and reconstruct the data from the encoded representation. By design, an autoencoder reduces data dimensions of input data by learning to ignore noise in the input data. In some aspects, an autoencoder may include an encoder in which the autoencoder learns how to reduce the input dimensions and compress the input data into the encoded representations, a bottleneck which is a layer of the autoencoder that contains the encoded representation of the input data, a decoder in which the autoencoder learns how to reconstruct the input data from the encoded representation to be as similar to the original input as possible, and reconstruction loss measuring how well the difference between the original input data and reconstructed input data. Further, the reconstruction loss may be used in a back propagation method to train the autoencoder.

Figure 2:
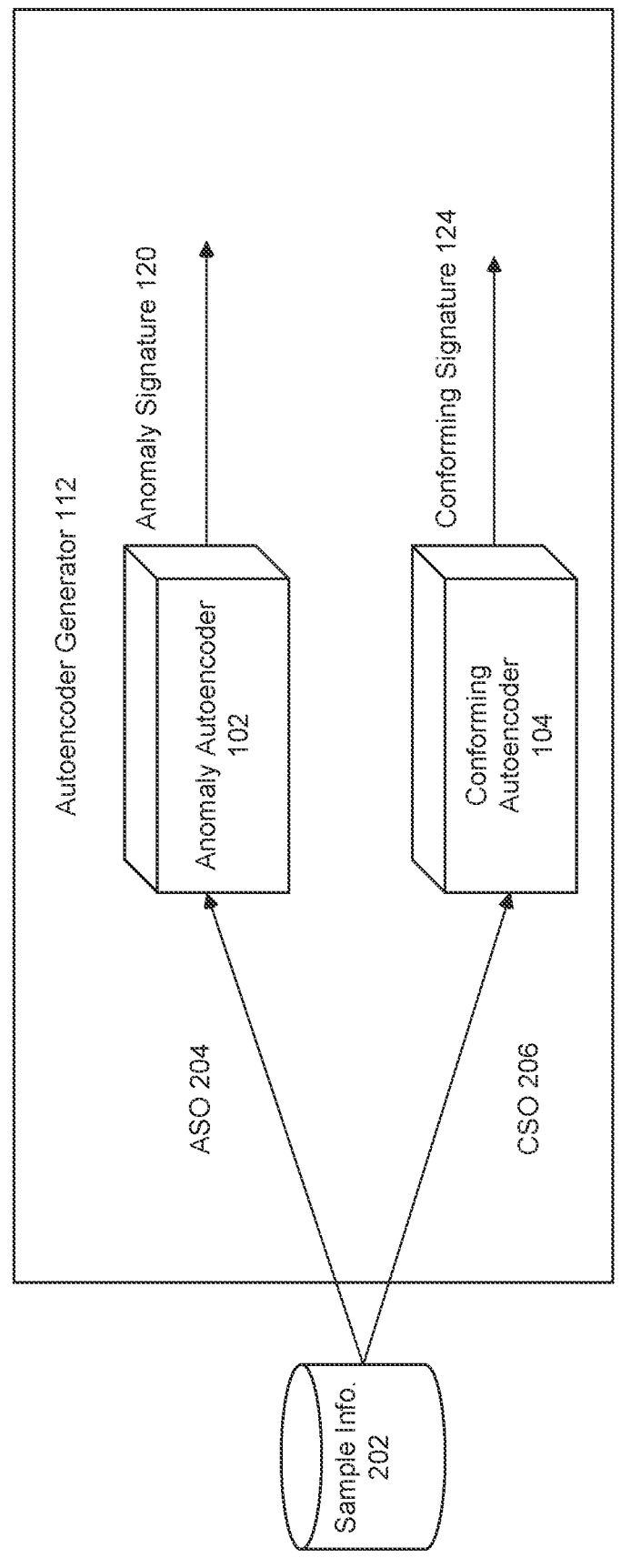
FIG. 2 is a diagram illustrating an example autoencoder generator, in accordance with some aspects of the present disclosure.

The anomaly autoencoder 102 may be trained by the autoencoder generator 112 using a plurality of anomalous observations, as described in detail with respect to FIG. 2. Further, as illustrated in FIG. 1, the anomaly autoencoder 102 may be configured to receive an observation 114 and send the anomaly autoencoder output (AAO) 116 generated at the bottleneck of the anomaly autoencoder 102 to the first distance generator 106. As used herein, in some aspects, an observation may refer to data point. For example, the observation 114 may be data having at least 1000 s of dimensions corresponding to user activity. Some examples of observation data include network performance metrics, sensor measurements, audio or video streams, and control signals.

The conforming autoencoder 104 may be trained by the autoencoder generator 112 using a plurality of conforming observations, as described in detail with respect to FIG. 2. Further, as illustrated in FIG. 1, the conforming autoencoder 104 may be configured to receive the observation 114 and send the conforming autoencoder output (CAO) 118 generated at the bottleneck of the conforming autoencoder 102 to the second distance generator 108.

The first distance generator 106 may be configured to compare the AAO 116 to an anomalous signature 120 to determine an anomaly value 122. In some examples, the anomaly value 122 may represent the difference between the AAO 116 and the anomalous signature 120. As an example, the conforming value 126 may be the Euclidean distance between the AAO 116 and the anomalous signature 120. Further, as described in detail with respect to FIG. 2, the anomaly autoencoder 102 may be further configured to generate the anomalous signature 120 at the bottleneck layer. In addition, in some aspects, the AAO 116 and the anomalous signature 120 may be vectors or tensors having the lowest dimension of all the layers of the anomaly autoencoder 102. Further, the first distance generator 106 may send the anomaly value 122 to the distance comparator 110.

The second distance generator 108 may be configured to compare the CAO 118 to a conforming signature 124 to determine a conforming value 126. In some examples, the conforming value 126 may represent the difference between the CAO 118 and the conforming signature 124. As an example, the conforming value 126 may be the Euclidean distance between the CAO 118 and the conforming signature 124. Further, as described in detail with respect to FIG. 2, the conforming autoencoder 104 may be further configured to generate the conforming signature 124 at the bottleneck layer. In addition, in some aspects, the CAO 118 and the conforming signature 124 may be vectors or tensors having the lowest dimension of all the layers of the conforming autoencoder 104. Further, the first distance generator 106 may send the conforming value 126 to the distance comparator 110.

Upon receipt of the anomaly value 122 and the conforming value 126, the distance comparator 110 may determine whether the observation 114 is anomalous or conforming. In particular, the distance comparator 110 may generate a result 128 based on the anomaly value and the conforming value 126. In some aspects, the result 128 may indicate that the observation is anomalous based on the AAO being less than the CAO, and indicate that the observation is conforming based on the CAO being less than the AAO.

For example, the distance comparator 110 may determine the result 128 as follows:

$$\text{result} = 1 - \frac{\text{Anomaly Value}}{\text{Conforming Value}} \qquad \text{(Equation 1)}$$

Where Anomaly Value is the distance between the AAO 116 and the anomalous signature 120 and Conforming Value is the distance between the CAO 118 and the conforming signature 124. Further, the result 128 may indicate that the observation 114 is anomalous based on the result being greater than a threshold amount.

FIG. 2 is a diagram 200 showing an example of an autoencoder generator 112, in accordance with some aspects of the present disclosure. As illustrated in FIG. 2, the autoencoder generator 112 may receive sample information 202 (e.g., sparse judgmental samples). Further, the sample information 202 may include a plurality of anomalous sample observations (ASO) 204 and a plurality of conforming sample observations (CSO) 206. The autoencoder generator 112 may train the anomaly autoencoder 102 using the ASO 204 and the conforming autoencoder 104 using the CSO 206. Once the anomaly autoencoder 102 is generated, the output of the bottleneck layer of the anomaly autoencoder 102 may be used as the anomalous signature 120. Further, once the conforming autoencoder 104 is generated, the output of the bottleneck layer of the conforming autoencoder 104 may be used as the conforming signature 124.

FIG. 3 is a diagram 300 showing an example of an autoencoder, in accordance with some aspects of the present disclosure. As illustrated in FIG. 3, the autoencoder 302 may include an encoder 304, an inner-most layer 306, a decoder 308, a loss function 310, gradient component 312. In some aspects, the encoder 304 and the decoder 308 may each include three layers. As an example, the first layer of the autoencoder 302 may receive input 314 having the dimension 22M by 500 and generate output having the dimension 22M by 250, the second layer may receive the output from the first layer and generate output having the dimension 22M by 50. Further, the output 316 of the third layer may be provided to the inner-most layer 306 (i.e., the bottle neck layer) which generates a signature 318. The decoder 308 may receive the output from the inner most-layer, and each layer of the decoder 308 may perform an inverse function of a layer in the encoder 304 to generate the reconstructed input 320. Further, the loss function 310 and the gradient component 312 may be employed to train and re-train the autoencoder 302, as is well known in the art. In some aspects, the autoencoder 302 may be trained periodically. Additionally, or alternatively, the autoencoder 302 may be trained in response to the difference between the reconstructed input 320 and the input 314 being greater than a threshold value.

Example Processes

FIG. 4 is a flow diagram illustrating an example method 400 for implementing anomaly detection, in accordance with some aspects of the present disclosure.

At block 402, the method 400 may include determining, for an observation, anomalous autoencoder output (AAO) of a first layer of a first autoencoder trained used anomalous observations. For example, the anomaly autoencoder 102 may generate the AAO 116 based on the observation 114.

Accordingly, anomaly detection system 100, the computing device 500, and/or the processor 502 executing the anomaly autoencoder 102 may provide means for determining, for an observation, anomalous autoencoder output (AAO) of a first layer of a first autoencoder trained used anomalous observations.

At block 404, the method 400 may include determining, for the observation, conforming autoencoder output (CAO) of a second layer of a second autoencoder trained used conforming observations. For example, the conforming autoencoder 104 may generate the CAO 118 based on the observation 114.

Accordingly, anomaly detection system 100, the computing device 500, and/or the processor 502 executing the conforming autoencoder 104 may provide means for determining, for the observation, conforming autoencoder output (CAO) of a second layer of a second autoencoder trained used conforming observations.

At block 406, the method 400 may include calculating an anomaly value based on comparing the AAO to an anomalous signature output by the first layer of the first autoencoder. For example, the distance generator 106 may compare the AAO 116 to the AS 120 to determine the anomaly value 122.

Accordingly, anomaly detection system 100, the computing device 500, and/or the processor 502 the distance generator 106 may provide means for calculating an anomaly value based on comparing the AAO to an anomalous signature output by the first layer of the first autoencoder.

At block 408, the method 400 may include calculating a conforming value based on comparing the CAO to a conforming signature output by the second layer of the second autoencoder. For example, the distance generator 108 may compare the CAO 118 to the CS 124 to determine the conforming value 126.

Accordingly, anomaly detection system 100, the computing device 500, and/or the processor 502 executing the distance generator 108 may provide means for calculating a conforming value based on comparing the CAO to a conforming signature output by the second layer of the second autoencoder.

At block 410, the method 400 may include determining whether the observation is anomalous based on comparing the anomaly value to the conforming value. For example, the distance comparator 110 may compare the anomaly value 122 to the conforming value 126 to determine whether the observation is anomalous.

Accordingly, anomaly detection system 100, the computing device 500, and/or the processor 502 executing the distance comparator 110 may provide means for determining whether the observation is anomalous based on comparing the anomaly value to the conforming value.

In an aspect, the method 400 may include wherein the first layer is an innermost layer of the first autoencoder, and the second layer is an innermost layer of the second autoencoder.

In an aspect, the method 400 may include wherein calculating the anomaly value comprises determining a first distance between AAO and the signature output of the first layer and calculating the conforming value comprises determining a second distance between the CAO and the signature output by the second layer.

In an aspect, the method 400 may include wherein the first distance and the second distance are Euclidean distances.

In an aspect, the method 400 may include wherein determining whether the observation is anomalous comprises determining that the observation is anomalous based on the first distance being less than the second distance.

In an aspect, the method 400 may include determining whether the observation is conforming comprises determining that the observation is conforming based on the second distance being less than the first distance.

In an aspect, the method 400 may include wherein determining whether the observation is anomalous comprises determining that the observation is anomalous based on a ration of the first distance to the second distance being less.

In an aspect, the method 400 may include wherein the first autoencoder is a first deep neural network having at least three layers preceding the first layer and the second autoencoder is a second deep neural network having at least three layers preceding the second layer.

In an aspect, the method 400 may further include actions in response to the determining. For example, the method 400 may include generating an alert or executing instructions in response to the anomaly. For example, the method 400 may include executing instructions to stop or alter a process that generated the observation determining that an observation is anomalous.

In some aspects, the first autoencoder is generated for conforming observations and a second autoencoder is generated for anomalous observations. Accordingly, the present technique employs the activations of the inner-most layers of the conforming and anomalous autoencoders as the signatures of the minority and majority class examples, respectively. In some aspects, the encoder and decoder networks may be mirror-images of each other. The encoder layer may have a decreasing dimensionality architecture and the decoder layer may have an increased dimensionality architecture. In some aspects, when passing observations through a low-dimensionality architecture and then back through a high-dimensionality architecture, the anomalous observations are more difficult to re-construct. Further, an anomaly score may be determined based on the re-construction error, with a higher anomaly score attached to observations that are more difficult to re-construct.

The present technique is very unique in the sense that it builds an autoencoder for the anomalous observations and another for the conforming observations and uses the activations of the inner-most layers of these autoencoders as the signatures for the anomalous and normal observations respectively. And uses the proximity of the new observation to be scored, passed through each of the dual deep autoencoders and classifies it as anomalous/normal based on the proximity to the signatures obtained in the prior step. The technical advantages of the present invention include intuitiveness, performance benefits (e.g., in some examples only ~0.01% or less of the data needs to be used for training), and language agnosticism (e.g., the present invention may be implemented on PyTorch, Keras, TensorFlow, MXnet).

While the operations are described as being implemented by one or more computing devices, in other examples various systems of computing devices may be employed. For instance, a system of multiple devices may be used to perform any of the operations noted above in conjunction with each other.

Illustrative Computing Device

Figure 5:
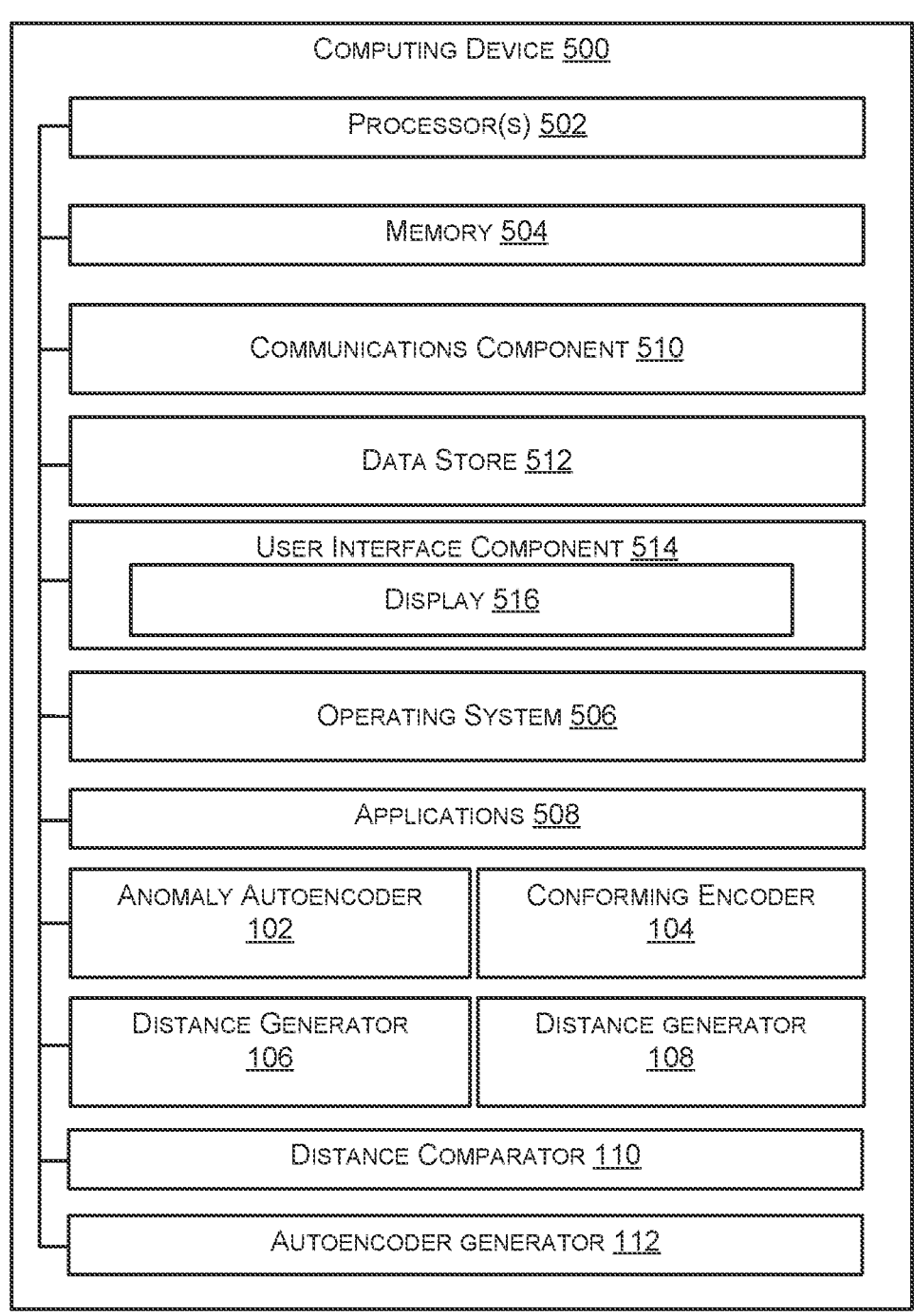
FIG. 5 is a block diagram illustrating an example of a hardware implementation for a computing device(s), in accordance with some aspects of the present disclosure.

Referring now to FIG. 5, an example of a computing device(s) 500 (e.g., anomaly detection system 100). In one example, the computing device(s) 500 includes the processor 502 for carrying out processing functions associated with one or more of components and functions described herein. The processor 502 can include a single or multiple set of processors or multi-core processors. Moreover, the processor 502 may be implemented as an integrated processing system and/or a distributed processing system. In an example, the processor 502 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 502 may include other processing components such as one or more arithmetic logic units (ALUs), registers, or control units.

In an example, the computing device 500 also includes memory 504 for storing instructions executable by the processor 502 for carrying out the functions described herein. The memory 504 may be configured for storing data and/or computer-executable instructions defining and/or associated with the observation 114, AAO 116, CAO 118, AS 120, CS 124, anomaly value 122, conforming value 126, and the processor 502 may execute the anomaly autoencoder 102, the conforming autoencoder 104, the first distance generator 106, the second distance generator 108, the distance comparator 110, and the autoencoder generator 112. An example of memory 504 may include, but is not limited to, a type of memory usable by a computer, such as random access memory (RAM), read only memory (ROM), tapes, magnetic discs, optical discs, volatile memory, non-volatile memory, and any combination thereof. In an example, the memory 504 may store local versions of applications being executed by processor 502.

The example computing device 500 may include a communications component 510 that provides for establishing and maintaining communications with one or more parties utilizing hardware, software, and services as described herein. The communications component 510 may carry communications between components on the computing device 500, as well as between the computing device 500 and external devices, such as devices located across a communications network and/or devices serially or locally connected to the computing device 500. For example, the communications component 510 may include one or more buses, and may further include transmit chain components and receive chain components associated with a transmitter and receiver, respectively, operable for interfacing with external devices.

The example computing device 500 may include a data store 512, which may be any suitable combination of hardware and/or software, that provides for mass storage of information, databases, and programs employed in connection with implementations described herein. For example, the data store 512 may be a data repository for the operating system 506 and/or the applications 508.

The example computing device 500 may include a user interface component 514 operable to receive inputs from a user of the computing device 500 and further operable to generate outputs for presentation to the user. The user interface component 514 may include one or more input devices, including but not limited to a keyboard, a number pad, a mouse, a touch-sensitive display (e.g., display 516), a digitizer, a navigation key, a function key, a microphone, a voice recognition component, any other mechanism capable of receiving an input from a user, or any combination thereof. Further, the user interface component 514 may include one or more output devices, including but not limited to a display (e.g., display 516), a speaker, a haptic feedback mechanism, a printer, any other mechanism capable of presenting an output to a user, or any combination thereof.

In an implementation, the user interface component 514 may transmit and/or receive messages corresponding to the operation of the operating system 506 and/or the applications 508. In addition, the processor 502 executes the operating system 506 and/or the applications 508, and the memory 504 or the data store 512 may store them.

Further, one or more of the subcomponents of the anomaly detection system 100, the anomaly autoencoder 102, the conforming autoencoder 104, the first distance generator 106, the second distance generator 108, the distance comparator 110, and the autoencoder generator 112, may be implemented in one or more of the processor 502, the applications 508, the operating system 506, and/or the user interface component 514 such that the subcomponents of the anomaly detection system 100, the anomaly autoencoder 102, the conforming autoencoder 104, the first distance generator 106, the second distance generator 108, the distance comparator 110, and the autoencoder generator 112 are spread out between the components/subcomponents of the computing device 500.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:

determining, for an observation, anomalous autoencoder output (AAO) of a first layer of a first autoencoder trained using anomalous observations, wherein the first layer is an innermost layer of the first autoencoder, wherein the first autoencoder is an anomaly autoencoder, and wherein a first output of a first bottleneck of the first layer of the first autoencoder is used as an anomalous signature;

determining, for the observation, conforming autoencoder output (CAO) of a second layer of a second autoencoder trained using conforming observations, wherein the second layer is an innermost layer of the second autoencoder, wherein the second autoencoder is a conforming autoencoder, and wherein a second output of a second bottleneck of the second layer of the second autoencoder is used as a conforming signature;

calculating an anomaly value based on comparing the AAO to the anomalous signature output by the first layer of the first autoencoder;

calculating a conforming value based on comparing the CAO to the conforming signature output by the second layer of the second autoencoder; and determining whether the observation is anomalous based on comparing the anomaly value to the conforming value.

2. The method of claim 1, wherein calculating the anomaly value comprises determining a first distance between AAO and the anomalous signature output of the first layer and calculating the conforming value comprises determining a second distance between the CAO and the conforming signature output by the second layer.

3. The method of claim 2, wherein the first distance and the second distance are Euclidean distances.

4. The method of claim 2, wherein determining whether the observation is anomalous comprises determining that the observation is anomalous based on the first distance being less than the second distance.

5. The method of claim 2, wherein determining whether the observation is conforming comprises determining that the observation is conforming based on the second distance being less than the first distance.

6. The method of claim 1, wherein the first autoencoder is a first deep neural network having at least three layers preceding the first layer and the second autoencoder is a second deep neural network having at least three layers preceding the second layer.

7. The method of claim 1, further comprising outputting a result indicating whether the observation is anomalous.

8. A non-transitory computer-readable device having instructions thereon that, when executed by at least one computing device, cause the at least one computing device to perform operations comprising:

determining, for an observation, anomalous autoencoder output (AAO) of a first layer of a first autoencoder trained using anomalous observations, wherein the first layer is an innermost layer of the first autoencoder, wherein the first autoencoder is an anomaly autoencoder, and wherein a first output of a first bottleneck of the first layer of the first autoencoder is used as an anomalous signature;

determining, for the observation, conforming autoencoder output (CAO) of a second layer of a second autoencoder trained using conforming observations, wherein the second layer is an innermost layer of the second autoencoder, wherein the second autoencoder is a conforming autoencoder, and wherein a second output of a second bottleneck of the second layer of the second autoencoder is used as a conforming signature;

calculating an anomaly value based on comparing the AAO to the anomalous signature output by the first layer of the first autoencoder;

calculating a conforming value based on comparing the CAO to the conforming signature output by the second layer of the second autoencoder; and determining whether the observation is anomalous based on comparing the anomaly value to the conforming value.

9. The non-transitory computer-readable device of claim 8, wherein calculating the anomaly value comprises determining a first distance between AAO and the anomalous signature output of the first layer and calculating the conforming value comprises determining a second distance between the CAO and the conforming signature output by the second layer.

10. The non-transitory computer-readable device of claim 9, wherein the first distance and the second distance are Euclidean distances.

11. The non-transitory computer-readable device of claim 9, wherein determining whether the observation is anomalous comprises determining that the observation is anomalous based on the first distance being less than the second distance.

12. The non-transitory computer-readable device of claim 9, wherein determining whether the observation is conforming comprises determining that the observation is conforming based on the second distance being less than the first distance.

13. The non-transitory computer-readable device of claim 8, wherein the first autoencoder is a first deep neural network having at least three layers preceding the first layer and the second autoencoder is a second deep neural network having at least three layers preceding the second layer.

14. The non-transitory computer-readable device of claim 8, the operations further comprising outputting a result indicating whether the observation is anomalous.

15. A system comprising:

a memory storing instructions thereon; and at least one processor coupled with the memory and configured by the instructions to:

determine, for an observation, anomalous autoencoder output (AAO) of a first layer of a first autoencoder trained using anomalous observations, wherein the first layer is an innermost layer of the first autoencoder, wherein the first autoencoder is an anomaly autoencoder, and wherein a first output of a first bottleneck of the first layer of the first autoencoder is used as an anomalous signature;

determine, for the observation, conforming autoencoder output (CAO) of a second layer of a second autoencoder trained using conforming observations, wherein the second layer is an innermost layer of the second autoencoder, wherein the second autoencoder is a conforming autoencoder, and wherein a second output of a second bottleneck of the second layer of the second autoencoder is used as a conforming signature;

calculate an anomaly value based on comparing the AAO to the anomalous signature output by the first layer of the first autoencoder;

calculate a conforming value based on comparing the CAO to the conforming signature output by the second layer of the second autoencoder;

determine whether the observation is anomalous based on comparing the anomaly value to the conforming value.

16. The system of claim 15, wherein to calculate the anomaly value, the at least one processor is further configured by the instructions to determine a first distance between AAO and the anomalous signature output of the first layer, and to calculate the conforming value, the at least one processor is further configured by the instructions to determine a second distance between the CAO and the conforming signature output by the second layer.

17. The system of claim 16, wherein to determine whether the observation is anomalous, the at least one processor is further configured by the instructions to:

determine that the observation is anomalous based on the first distance being less than the second distance.

18. The system of claim 16, wherein to determine whether the observation is conforming, the at least one processor is further configured by the instructions to:

determine that the observation is conforming based on the second distance being less than the first distance.

19. The system of claim 15, wherein the first autoencoder is a first deep neural network having at least three layers preceding the first layer and the second autoencoder is a second deep neural network having at least three layers preceding the second layer.

20. The system of claim 15, wherein the at least one processor is further configured by the instructions to output a result indicating whether the observation is anomalous.

* * * * *